Patented Sept. 20, 1932

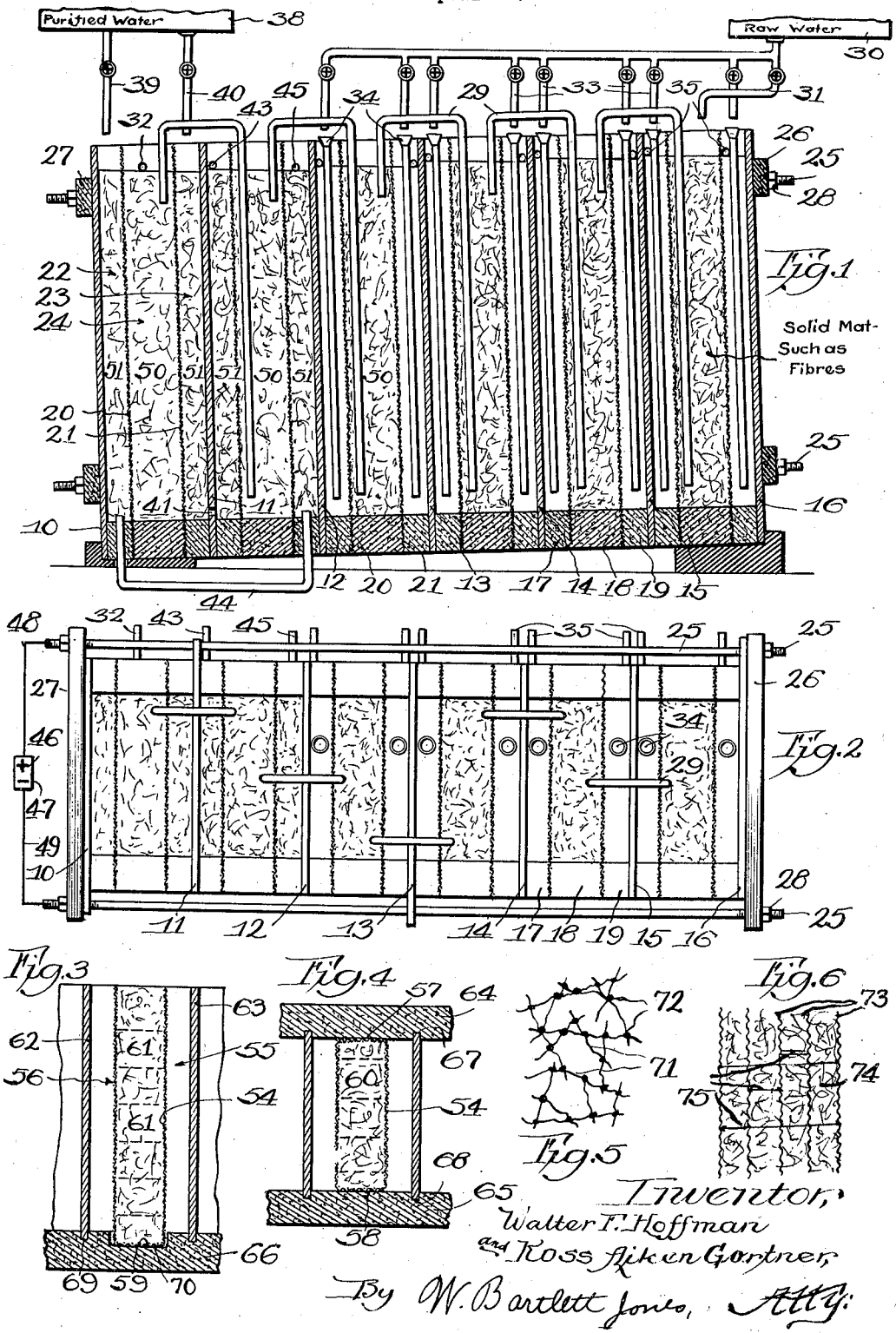

1,878,237

UNITED STATES PATENT OFFICE

WALTER F. HOFFMAN, OF CLOQUET, AND ROSS AIKEN GORTNER, OF ST. PAUL, MINNESOTA, ASSIGNORS TO THE NORTHWEST PAPER COMPANY, OF CLOQUET, MINNESOTA, A CORPORATION OF MINNESOTA

ELECTRICAL PURIFICATION OF WATER

Application filed April 24, 1930. Serial No. 446,845.

The present invention relates to the purification of water by electrical process, and has particular reference to improvements in the process and materials and apparatus therefor.

Electricity is used to purify water of colloidal and electrolytic impurities, using the principle of electrodialysis. Water to be purified is placed in a three compartment cell having anode and cathode compartments, and a water compartment, the compartments being separated by suitable diaphragm material, such as canvas or duck. A direct current is passed through the water causing positive ions and colloids to move towards the cathode and negative ions and colloids to move towards the anode. The charged units pass through the diaphragms which preclude free passage of the water, and leave the water in the middle compartment in a purified condition. The extent to which the water is subjected to current in part determines the extent of purification. The relative concentration of impurities on opposite sides of the diaphragm also determines the extent of purification. To obtain highly purified water much energy for a long time is required to remove the last traces of impurities.

In the practice of the process in a commercial way the back diffusion of the impurities from the electrode chambers into the water chamber is minimized by flushing the electrode chambers with water, either purified or raw.

Certain difficulties are experienced with the process to secure economical and commercial operation of the process. Highly purified water cannot be obtained in a single cell when the electrode compartments are flushed with raw water, for into each electrode chamber there are introduced those impurities of the original water which must migrate across the water chamber toward the other electrode. This difficulty is in part overcome by running a number of cells in series, allowing the water to flow from cell to cell, and using in the last portions of the series a purified water to wash out the electrode compartments.

The rate of removal of material from the water varies with the current flowing through the cell, and varies in the same direction as the concentration of the impurities in the water that are removable by the current. As the water becomes purified by this process its conductivity is decreased and it becomes more difficult to secure an adequate current through the liquid. Increased voltage per unit length of path is therefore required for causing sufficient current to flow. In a series of six cells wherein all electrode chambers of the first five cells are washed with raw water and the last cell, delivering purified water, is washed with purified water, it is customary to connect the three first cells in series on the power line, then the fourth and fifth cells, and last of all to connect the sixth cell directly across the line. This arrangement is efficient to permit combined operation of the six cells to deliver purified water. The last cell, being of the lowest conductivity, must finish the purification to the desired degree, and the efficiency of the last cell is an important factor. For example, if the last cell can be made more efficient, and the same improvement applied to the other cells the speed and the efficiency of the process can be greatly increased.

The present invention aims to improve the time and power efficiency of the purification process.

One object of the invention is to increase the conductance of a cell without the addition of ionic or removable impurities to the water.

A particular object of the invention is the addition to the water in the cell, in any or all compartments, of non-conducting solid material presenting a very large surface, which material is incapable of contaminating, but which has the property of increasing the conductance of the system by virtue of forces acting between the surface of the material which is added and the liquid in which the solid material is contained.

A specific object of the invention is the formation of a continuous conducting surface across the cell between the diaphragms, or between the electrodes, employing material which is fibrous in nature, such as vegetable fibers, like cotton, or chemical wood pulp.

Various other objects and advantages of the invention will be apparent from the following description of the invention as it is exemplified by the construction and operation of the apparatus shown in the accompanying drawing in which:

Fig. 1 is a vertical cross sectional view of a series of cells clamped into a unit structure.

Fig. 2 is a plan view of the cells of Fig. 1.

Fig. 3 is a fragmentary cross-section of a modified form of cell unit.

Fig. 4 is a plan view of the fragment shown in Fig. 3.

Fig. 5 is a representation of a net-work of fibers.

Fig. 6 is a cross-sectional view of a pad of fibrous material.

Ordinarily, if water is subjected to purification by electrodialysis the conductivity decreases as the impurities are removed, and the applied potential must be increased to maintain the same current flow through the cell. Even with the same current flow, the decrease in concentration of impurities causes a lessened rate of removal of the impurities. It is, therefore, apparent that as the water approaches a high degree of purity the process is very slow and a large amount of power is wasted, in comparison with the time and efficiency of the process in removing the first portion of impurities. The wasted energy is expended in liberating gases at the electrodes and in heating the water.

The present invention is based upon observations made in conducting electrodialysis in the presence of fibrous materials. It was found that when fibers were employed in a very low concentration the process of purification was prolonged and power-consuming, as compared to the results obtained when there were sufficient fibers present in the water to form a continuous fibrous compartment between the diaphragms. It is supposed by us upon grounds, not necessarily stated herein, that the fibers provide a surface conduction along the fibers that is in addition to and distinct from the conductance of the solution without the fibers present. The effect is not due to the fact that the material employed is fibrous, but to the fact that fibers merely exemplify the materials which provide in the solution or the liquid, a large surface or interface between liquid and solid substance. It is known that such interfaces produce a double electrical layer, in which positive and negative layers are formed at the interface. The application of a potential to opposite ends of the layers causes a migration of the charged units in the layers. These layers appear to provide current channels for the removable units or the charged units that exist by dissociation of water. The impurities act as if they enter such channels or become concentrated therein and move rapidly toward the electrodes.

When fibers or equivalent surface conducting material are absent from water to be purified, the positive and the negative units travel in opposite directions in an unordered arrangement, like two crowds moving in opposite directions at the same time and place. By adding material providing the so-called surface conductance, according to this invention, the motion of the positive and negative units becomes ordered, the positive units aligning themselves parallel with the oppositely moving aligned negative units. The presence of fiber in water without electrolyte or other charged units, except the normal ions of dissociated water, gives to the mixture a greater conductance than the same water has without the fiber. This indicates the creation of a current carrying channel in addition to and distinct from the normal ionic conductance, and the increased conductance in a measure resembles metallic conduction with the apparent distinction that it can draw upon the surrounding liquid medium for the charged units that function in the new channel. Even though electrolytes are present in the water, the effect of increased conductance can be observed.

We have found in a variety of experiments in electrodialysis with materials other than water, that in the presence in the liquid subjected to dialysis, of solids that provide large surface area and that are nonconducting, the time efficiency and power efficiency of dialysis is increased. The effect is more noticeable as the removable impurities decrease, and approach a substantially zero concentration.

In carrying out the invention we use loose solid material having a high specific area such as chemical wood pulp, ground wood pulp, vegetable fibers, cotton, glass wool, silica gel, bundles of capillary tubes, spaced sheets, etc., and other, of themselves, non-conducting or poorly conducting insoluble materials which form a large interfacial area with surrounding liquid. We prefer fiber because of its swelling in water, its flexibility and its elongated form, which readily permits forming a continuous path across the cell. Glass is slowly decomposed in time and therefore is not as good as cellulose. The material is preferably placed in the middle compartment of a dialysis cell in sufficient concentration to provide a surface conductance path across the cell between the diaphragms, yet to leave liquid channels in the suspension. Similar materials may be added to the electrode chambers to increase the efficiency in those chambers. The advantage of using the materials in the electrode chambers is somewhat inversely related to the concentration of impurities in said chambers, because the conductance of the electrode liquid is normally greater than the conductance of the liquid being purified. The increased conductance produced in the middle compartment by the addition agent brings the conductance of the three liquids involved in any cell more nearly to a par.

In the following description the cells described include those with and without added material in the electrode chambers. The invention is described with particular reference to apparatus used commercially for the purification of water, and certain changes in construction will be noted by those who may be familiar with the apparatus, which changes are made desirable because of the use of the present invention.

Generally, the unit comprises six cells which are connected together in filter-press form, as clamped units of stacked plates providing the electrodes and the liquid chambers, with partitioning diaphragms. Seven electrodes are illustrated numbered from 10 to 16 in sequence of arrangement. The electrode material is preferred to be such that it may function both as anode and cathode without detriment to the process. Graphite may be employed and certain composition electrodes are known and used in the art, no particular material being essential to this invention. Three U-shaped frames 17, 18 and 19 are shown clamped between each set of adjacent electrodes. Suitable insulating material capable of withstanding the clamping pressure and of producing a tight joint is employed, wood, or synthetic resin products being excellent for the purpose. Between frames 17 and 18 and frames 18 and 19 are clamped diaphragm sheets, such as closely woven canvas or duck. A diaphragm pervious to colloidal materials is preferred in order to prevent too much accumulation of such materials on an impervious-to-colloid diaphragm. The diaphragms are designated 20 and 21. Thus each cell is formed with electrode compartments 22 and 23 and middle or water compartment 24.

The end cells having the exposed electrodes 10 and 16 are employed to receive clamping means which hold all the cells assembled in a unitary structure. Tie rods 25 and insulating headers 26 and 27 are illustrated as conventional clamping means, and nuts 28 serve to tighten the clamp thus formed.

The clamped unit in use is mounted on an incline as illustrated in order to produce a gravity flow of water through the same from cell to cell. Siphons may be inserted from cell to cell to convey the water continuously from high end to the low end of the unit through the middle compartments 24. Siphons 29 are shown which at one end reach to the bottom of a cell and at the other end terminate near the top of the adjacent cell. Raw water is dropped from a supply 30 at a controlled rate through a regulated valved line 31, into the highest cell, and water is discharged from the last cell through an overflow pipe 32.

Raw water is fed from supply 30 by valved lines 33, preferably in a broken stream into the electrode compartments, pipes 34 carrying the flushing water to the bottom of the cell from which it rises to the overflow outlets 35. The outlets permit the overflow water to drop in a broken stream to a waste receptacle (not shown).

Certain of the electrode chambers may be flushed with water which has been wholly or partly purified. The last cell of the series is shown as being flushed with purified water, and the second last cell is shown being flushed with water less pure than the highly purified water, but more pure than raw water. This is accomplished by flushing the last cell with a purified water, such as distilled water, or water purified wholly or in part by the process of electrodialysis, so that each electrode compartment discharges an effluent which is more impure in either a positive or negative impurity, but which is fully as pure, if not purer as regards the oppositely charged impurity. For example, in the last cell the flushing water may contain but slight amounts of positive and negative impurities. The cathode effluent will be richer in positive impurities and poorer in negative impurities if there is any change at all. Even though the effluent is as impure in positive impurities as raw water, it is far more desirable as a cathode flush than raw water for the reason that it is poor in negative impurities that tend to move out of the cathode compartment.

A purified water supply 38 is shown from which flushing water is admitted through valved pipes 39 and 40 to the top of the electrode chambers of the lowest and last cell of the series. Electrode 11 is perforated at the bottom as shown at 41 to establish communication between the adjacent electrode chambers, permitting the effluent of the last cell to flush out the second last cell at the outlet 43. As will be explained later, the electrode 11, so perforated performs the same function, either as anode or as cathode, for the adjacent cells. A connecting pipe 44 is shown between the two remaining electrode chambers of these two cells so that the effluent of the last and outside electrode chamber washes out the corresponding chamber of the adjacent cell at outlet 45. Further countercurrent flow of the electrode chamber effluent and water to be purified might be practiced, and the extent of the reuse of effluent and countercurrent flow will depend upon the balance between the parts that it is desired to maintain.

The electrical connections comprise direct current terminals 46 and 47 connected by leads 48 and 49 to two tie rods 25 which may act as bus bars. Electrodes 11 and 16 are connected to lead 48, and electrodes 10 and 13 are connected to lead 49, and each of these electrodes acts either as anode or as cathode for two cells. The electrodes 12, 14 and 15 which are not connected to any lead act as anode for one cell and as cathode for the adjacent cell.

In each cell, particularly in the middle chambers 24, there is shown a bulk of solid material, in the present instance the material representing cellulose fibers such as chemical wood pulp 50. The pulp may be present in proportion to form about a 6% slurry of pulp and water. The concentration may be varied at least between the limits of 8% and 3% without losing the desired benefits of the invention. Too high a concentration may cause packing of the material to close or block the channels of liquid flow, and too low a concentration may prevent the formation of a complete or adequate fibrous path across the cell. The pulp or other solid may be loose and merely in loose contact, one particle with another, or it may be provided in a united mass, such as a pad of cotton, or a pad of loosely felted or cemented fibers. The last two cells of the series are shown as having fiber 51 in the electrode compartments.

In Figs. 3 and 4 there is shown a modified form of cell in which the central compartment is removable as a unit, comprising in the present instance the diaphragms and fiber contained between the diaphragms. The unit is preferably provided with a bottom so that the whole may be removed while full of liquid. In the present instance it comprises a canvas bag 54 formed in rectangular shape, the larger faces 55 and 56 serving as the diaphragms, the sides 57 and 58 and the bottom 59 merely completing the structure and performing no particular function as canvas material. Within the bag, solid material, in accordance with this invention, may be placed, but it is preferred that fibers 60 be employed, as a pad, quilted or otherwise fastened into the bag to prevent the formation of channels in use. Long cotton fibers for example may be quilted as indicated by threads 61.

A cell body has a box like structure in which the electrodes 62 and 63 are placed on opposite sides 64, 65 and bottom 66 in grooves 67, 68 and 69 which receive them. The box structure may be elongated, as indicated by the fragmentary extensions beyond the single cell completely shown, thus eliminating the clamping structure illustrated in other figures. The box may be somewhat grooved as at 70 to receive the fiber unit.

Dialysis pads and even diaphragms may be made by cementing together a loose mass of fibers, using cellulose regenerated from viscose as a binding agent, or using such other cement as will not be detrimental to the process, for example, a synthetic resin product. Care should of course be taken that the active surface of the cellulose is not destroyed by embodying too much of the individual fibers in the cement. A fragmentary view of such a pad structure is shown, in Fig. 5, 71 indicating fibers, and 72 cement. Fibers may also be held in a woven base, using the fibers as a sort of knap like plush, or the fibers may be contained between layers of netting. In Fig. 6 a series of sheets 73 of netting is shown with fibers 74 between them. Tie members, or spacers 75 are illustrated which may be rigid or flexible, wood splints, or thread.

The use of pads or solid material in the dialysis not only increases the efficiency of the cells but also makes the apparatus more easily cleaned. Fibers, for example, collect non-removable impurities, which would otherwise collect in the bottom of the cell and on the diaphragms. Removal of the fibers, and cleaning or replacing them, is a more effective method of cleaning the cell, and the useful period of operating the diaphragms will be considerably increased.

In using solid materials for this invention, no particular attention need be paid to employing pure materials at the outset, such as purified pulp. The cells should be used until the impurities are removed from the solid materials, and thenceforth the operation of the cells will proceed normally as if pure materials had been employed initially. In using fiber, such as chemical wood pulp, which may contain a high ash content, the dialysis process, soon removes the ash from the fibers as well as the impurities from the water, and the process becomes one of purifying fibers as well as water. This method of purifying fibers, and the product, form the subject matter of copending applications referred to.

This application is a continuation in part of our prior application Serial No. 300,662, filed August 20, 1928. The latter application is generic to this invention and is a continuation in part of our prior application Serial No. 54,003, filed September 2, 1925.

We claim:

1. The method of purifying water which comprises flowing water through a series of electrodialysis cells through a continuous mass of fibrous material contained between the diaphragms of the cells.

2. The method of purifying water which comprises electrodialysing water in the presence of a mass of fibers between the diaphragms of an electric cell.

3. The method of purifying water which comprises electrodialysing water in the presence of a mass of fibers extending between the electrodes of an electric cell, and lying on both sides of the diaphragms of the cell.

4. The method of purifying water which comprises subjecting water to electrodialysis in a three-compartment diaphragm cell in the presence of fibers extending between the electrodes and lying on both sides of the diaphragms, and flushing the electrode compartments with water.

5. The method of purifying water which comprises subjecting water to electrodialysis in a three-compartment diaphragm cell in the presence of fibers extending between the electrodes and lying on both sides of the diaphragms, and flushing the electrode compartments with purified water.

6. The method of purifying water which comprises subjecting to electrodialysis a stream of water slowly flowing through a series of at least two electrodialysis cells into and out of the middle compartment of the first cell, then into and out of the middle compartment of the second cell through a mass of fibers in said compartments, and flushing the electrode compartments of the second cell with purified water through fibers between the electrodes and the diaphragms, and utilizing the effluent from said electrode compartments to flush the corresponding electrode compartments of the first cell.

7. In an electrodialysis apparatus, a compartment bounded on the electrode sides by non-conducting diaphragm material and containing fibers between the diaphragms in concentration to form a continuous fibrous path therebetween when the fibers are immersed in water.

8. A filler pad for a compartment of an electrodialysis cell comprising vegetable fibers bound together into a loose but continuous mass.

9. An electrodialysis cell comprising in combination a three compartment cell having diaphragms between the middle and the electrode compartments, electrodes in said electrode compartments, and fibrous material extending from each electrode to the adjacent diaphragm, and from one diaphragm to the other diaphragm, said fibrous material being sufficient to form a continuous fibrous path over its extent when submerged in water, and being sufficiently loose to permit flow of liquid freely therethrough.

10. The method of purifying water which comprises flowing water through a series of electrodialysis cells through a mass of solid insoluble material having a high specific area to provide a large interfacial area with the water, said material being contained between the diaphragms of the cell.

11. The method of purifying water which comprises electrodialysing water in the presence of a mass of solid insoluble material having a high specific area to provide a large interfacial area with the water, said material being contained between the diaphragms of the cell.

12. The method of purifying water which comprises electrodialysing water in the presence of a mass of solid insoluble material having a high specific area to provide a large interfacial area with the water, said material extending between the electrodes of an electrodialysis cell, and lying on both sides of the diaphragms.

13. The method of purifying water which comprises subjecting water to electrodialysis in a three-compartment diaphragm cell in the presence of solid insoluble material having a high specific area to provide a large interfacial area with the liquid, said material extending between the electrodes and lying on both sides of the diaphragms, and flushing the electrode compartments with water.

14. The method of purifying water which comprises subjecting water to electrodialysis in a three-compartment diaphragm cell in the presence of solid insoluble material having a high specific area to provide a large interfacial area with the liquid, said material extending between the electrodes and lying on both sides of the diaphragms, and flushing the electrode compartments with purified water.

15. The method of purifying water which comprises subjecting water to electrodialysis in the presence of material insoluble in water and arranged therein to provide a large interfacial area with the water in the general direction of current flow.

16. The method of purifying water which comprises subjecting to electrodialysis a stream of water slowly flowing through a series of at least two electrodialysis cells into and out of the middle compartment of the first cell, then into and out of the middle compartment of the second cell through a mass of solid material suspended in said compartments, said material being of such a character as to provide a high specific area, being nonconducting and providing liquid channels throughout the suspension, flushing the electrode compartments of the second cell with purified water through a similar suspension of solid material between the electrodes and the diaphragms, and utilizing the effluent from said electrode compartments to flush the corresponding electrode compartments of the first cell.

17. The method of purifying water by electrodialysis which comprises suspending in the water a mass fibrous material in sufficient concentration to form a continuous fibrous path in the direction of current flow, confining the mass against entry of water from the electrode compartments by means permeable to impurities to be removed by electrodialysis, and subjecting the confined mass to an electric potential to cause a current to flow through the mass.

18. The method of purifying water by electrodialysis which comprises suspending in the water a mass of fibrous material in sufficient concentration to form a continuous fibrous path in the direction of current flow, confining the mass against entry of water from the electrode compartments by means permeable to impurities to be removed by electrodialysis, subjecting the confined mass to an electrical potential to cause a current to flow through the mass, and removing impurities from the vicinity of said confining means after passage therethrough.

In testimony whereof we have hereunto affixed our signatures.

WALTER F. HOFFMAN.
ROSS AIKEN GORTNER.